United States Patent [19]

Davis

[11] Patent Number: 5,138,874
[45] Date of Patent: Aug. 18, 1992

[54] DIAGNOSTIC SYSTEM FOR DETECTING FAULTS IN ENGINE AIR INTAKE CHECK VALVES

[75] Inventor: Richard S. Davis, Romeo, Mich.

[73] Assignee: General Motors Corporation, Detroit, Mich.

[21] Appl. No.: 723,982

[22] Filed: Jul. 1, 1991

[51] Int. Cl.$^5$ .......................................... G01M 15/00
[52] U.S. Cl. ................................................ 73/118.1
[58] Field of Search ................ 73/118.1, 168, 117.3, 73/865.9; 340/425.5; 364/431.07, 431.08, 431.03, 431.04

[56] References Cited

U.S. PATENT DOCUMENTS 4,694,693 9/1987 Gerlowski ............................ 73/168

Primary Examiner—Robert Raevis
Attorney, Agent, or Firm—Jimmy L. Funke

[57] ABSTRACT

A system is disclosed for diagnosing faulty check valve operation in an internal combusiton engine having a back flow preventing check valve positioned in each intake air passage leading to an engine cylinder. The system measures the pressure in the engine air induction system, upstream of each check valve and downstream from an air intake throttle valve. The system produces an indication of faulty check valve operation, when an abnormal fluctuation in the measured pressure is detected. Preferably, the diagnostic function is performed when the engine operates in a defined mode, at idle speeds with light engine loading, where the pressure differential appearing across each check valve is essentially maximized. The engine cylinder associated with a faulty check valve is identified based upon the sensed rotational position of the engine when an abnormal fluctuation in pressure is detected.

10 Claims, 6 Drawing Sheets

DIAGNOSTIC SYSTEM FOR DETECTING FAULTS IN ENGINE AIR INTAKE CHECK VALVES

BACKGROUND OF THE INVENTION

This invention relates to a system for diagnosing faulty check valve operation in an internal combustion engine having a back flow preventing check valve positioned in each air intake passage leading to an engine cylinder.

It is generally known that at high operating speeds, the performance of a four-stroke internal combustion engine can be improved by advancing the opening and retarding the closing of cylinder intake valves during the engine operating cycle. Opening a cylinder intake valve early, while its respective exhaust valve is still open (known as cross-over), facilitates the discharge of gaseous combustion products from the cylinder at high engine speeds, while delaying the closing of the intake valve, until after beginning of cylinder compression, improves cylinder filling.

Both of the above valve timing modifications improve high speed engine performance, however, the torque produced at low speeds is significantly reduced. This occurs because the inertia of the intake air inducted into the engine decreases at low engine speeds. As a result, a portion of the air-fuel charge in each cylinder is driven back into the air induction system at low engine speeds, due to the delayed intake valve closing. In addition, when the engine is operated under light loading conditions, exhaust products are able to flow from the exhaust system back into the engine cylinders and air induction system during the cross-over period. This can result in cylinder misfires and rough engine idling.

It is also generally known that the above low speed drawbacks can be obviated by placing check valves in the engine air induction system. These check valves are typically placed downstream of the air intake throttle valve, in each air passage leading to an engine cylinder. Each check valve is positioned to allow air flow in a direction toward its associated cylinder, but prevent back flow in the opposite direction, away from the cylinder. Consequently, engine volumetric efficiency and torque output are greatly improved at low speeds and combustion stability is improved under light engine loading conditions.

In this type of engine, if one of the intake passage check valves becomes damaged or malfunctions, the engine will not perform properly at low speeds. The back flow of exhaust gas into the associated cylinder can cause misfires and rough engine idling. Also, the decreased volumetric efficiency of the cylinder reduces the output torque. In addition, the cylinder associated with the faulty check valve will receive less air, while the other cylinders receive excess air. This produces incorrect cylinder air-fuel mixtures and increases engine exhaust emissions.

Consequently, there exists a need for a system, which is capable of diagnosing and indicating faulty check valve operation in engines equipped with such valves, to ensure proper engine performance and low exhaust emissions.

SUMMARY OF THE INVENTION

Accordingly, the general object of the present invention is to provide a system for diagnosing faulty check valve operation in engines having back flow preventing check valves positioned in air intake passages leading to each engine cylinder. The system measures the pressure of air in the induction system, upstream of each check valve and downstream from the induction system throttle valve. An indication of faulty check valve operation is then produced, if an abnormal fluctuation in the measured pressure is detected. Since modern engine computer control systems generally include a sensor for measuring the pressure in the air induction system and a warning indicator to alert an operator when the engine malfunctions, the present invention can be implemented in such control systems by simply making computer software changes, without requiring any additional hardware.

Preferably the system performs the diagnostic function when the engine is operating in a defined mode at engine idle speeds with light engine loading. In this operating mode, the pressure differential appearing across each check valve is essentially maximized. Consequently, a malfunctioning check valve will produce larger fluctuations in the measured pressure, when the engine is operating in this mode, making detection easier and more certain.

In one embodiment of the present invention, a peak value associated with the measured pressure in the induction system is obtained and compared with a predetermined threshold value. If the peak value exceeds the threshold value, the system indicates that an abnormal fluctuation in the measured pressure has occurred. Preferably, the peak value is obtained by sampling the measured pressure to obtain a set of sampled pressure values, and selecting a largest value from among the set of sampled pressure values to obtain the peak value associated with the measured pressure.

In another embodiment, a peak-to-peak value associated with the measured induction system pressure is obtained and compared with a predetermined threshold value. If this peak-to-peak value exceeds the threshold value, the system indicates that an abnormal fluctuation in the measure pressure has occurred. Preferably, the peak-to-peak value is obtained by sampling the measured pressure to obtain a set of sampled pressure values, selecting a largest and a smallest value from among the set of sample pressure values, and then subtracting the largest and smallest values to obtain the peak-to-peak value associated with the measured pressure.

In both of the above embodiments, it is preferable that the diagnostic system sample the measured pressure over more than one engine operating cycle to obtain a predetermined number of sample pressure values for the set. Since an abnormal fluctuation in measured pressure repeats once every engine cycle, excessive sampling rates are not then required to obtain accurate peak or peak-to-peak values. Additionally, the sampling does not have to be synchronized with the rotation of the engine, when the sampling is extended over more than one engine cycle.

According to one aspect of the invention, the diagnostic system is provided with a means for determining an engine rotational position corresponding to the occurrence of the abnormal fluctuation in the measured pressure caused by a faulty check valve. The diagnostic system then identifies and indicates the cylinder associated with the faulty check valve based upon the determined engine rotational position. Consequently, a substantial reduction in the time required to identify and repair faulty check valves can be realized with the use of the present invention.

According to another aspect of the invention, an indication of faulty check valve operation is produced, only after a predetermined number of sequential abnormal fluctuations are detected in measured pressure. This reduces the chance of an incorrect diagnosis caused by the occurrence of measurement noise or pressure transients.

These and other aspects and advantages of the invention may be best understood by reference to the following detailed description of the preferred embodiments when considered in conjunction with the accompanying drawings.

DESCRIPTION OF THE PREFERRED EMBODIMENTS

Figure 1:
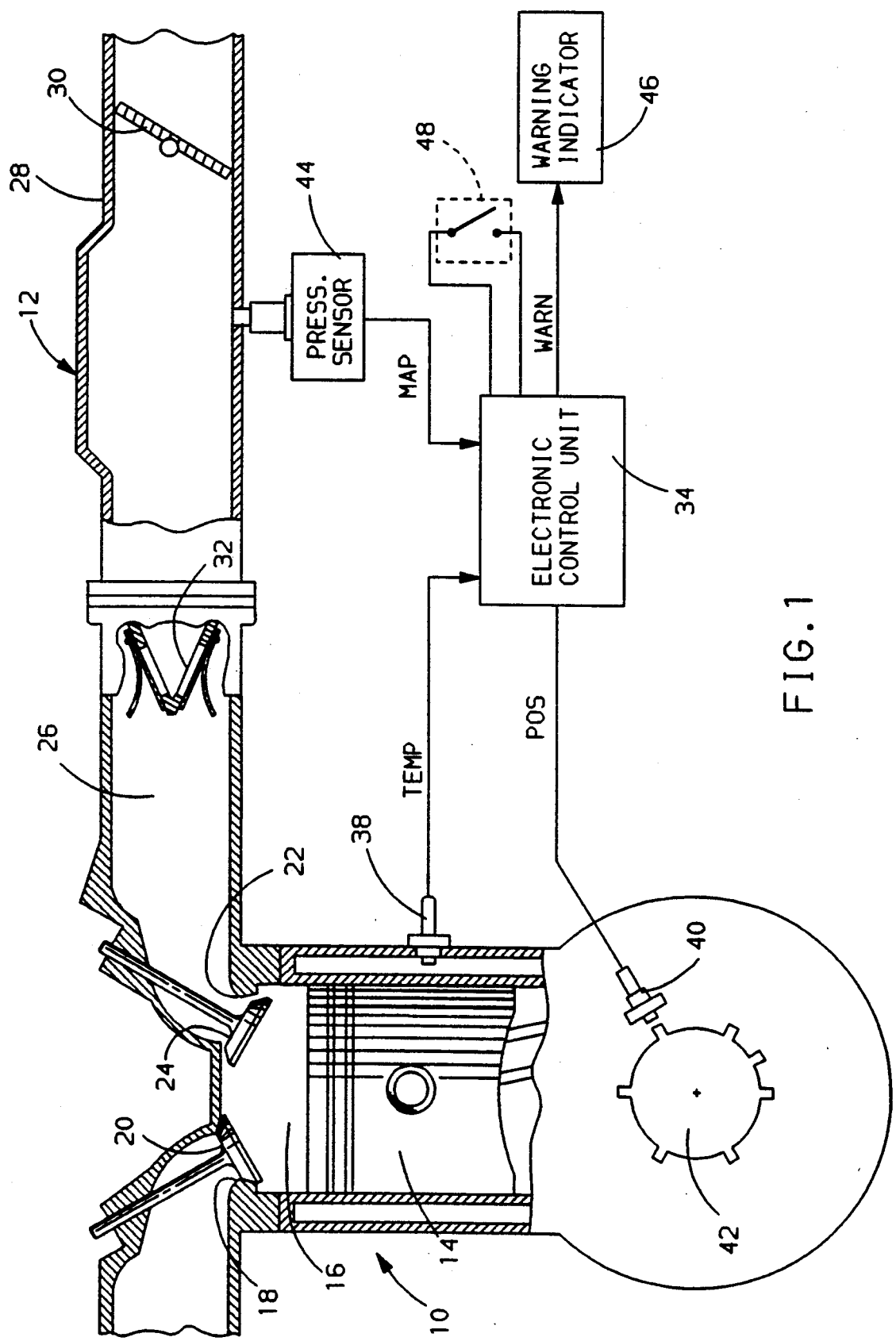
FIG. 1 schematically illustrates an internal combustion engine having a check valve in each cylinder air intake passage and a system for diagnosing faulty check valve operation in accordance with the principles of the present invention.

Referring now to the drawings, and in particular to FIG. 1, there is shown schematically an internal combustion engine generally designated as 10, which includes an air induction system, generally referred to as 12, for supplying the engine 10 with air for the combustion process. Engine 10 further includes a piston 14 disposed in a cylinder 16, and exhaust port 18 and intake port 22, with exhaust valve 20 and intake valve 24 seated respectively therein.

The air induction system 12 of engine 10 includes an air passage 26 leading to the intake port 22 of cylinder 16, an air intake manifold 28 communicating with the air passage 26, and an adjustable air throttle valve 30 disposed within the intake manifold 28 for controlling the quantity of air flowing into engine 10. A check valve 32 is positioned in the air passage 26 leading to cylinder 16, downstream from the throttle valve 30. The check valve 32 allows air to flow in a direction toward cylinder 16, but prevents back flow in the reverse direction, away from cylinder 16. As shown, check valve 32 is a reed type valve, however, any other kind of back flow preventing valve known in the art may also be used.

Although only a single engine cylinder 16 is illustrated in FIG. 1, engine 10 can have multiple cylinders with intake manifold 28 communicating in parallel with the air passages and check valves leading to the engine cylinders.

Also shown in FIG. 1 is a conventional electronic control unit (ECU) 34, which is customarily used for controlling the operation of engine 10 to achieve desired performance characteristics. The ECU 34 generally includes a central processing unit, random access memory, read only memory, analog-to-digital and digital-to-analog converters, input/output circuitry, and clock circuitry, as will be recognized by those skilled in the art of computer engine control.

In controlling engine 10, the ECU 34 receives input signals from several standard engine sensors. Typically, a temperature sensor 38 provides ECU 34 with a TEMP input signal, related to the engine coolant temperature. The TEMP input signal is sequentially sampled by the analog-to-digital circuitry within ECU 34, with the most recent Kth sample value being stored in random access memory as a variable TEMP(K).

Additionally, the ECU 34 is generally provided with a POS input signal for deriving the rotational position of the engine. The POS input signal can be obtained from any conventional rotational sensor, such as the electromagnetic sensor 40 and accompanying toothed wheel 42 shown in FIG. 1. The electromagnetic sensor 40 detects the passage of teeth on wheel 42 as it is rotated by the engine and produces corresponding pulses in the POS input signal. The asymmetrical tooth on wheel 42 provides a reference position in the engine cycle (for example top dead center in the exhaust stroke), with the symmetrically spaced teeth corresponding to known rotational angles from the reference position. One complete rotational cycle in a four-stroke engine requires 720° or two complete revolutions of the engine crankshaft (not shown). Wheel 42 can be rotated by the engine camshaft (not shown), which rotates one revolution each engine cycle, so that the rotational angle of the engine in its 720° cycle can be determined. The ECU 34 computes the current rotational angle of the engine by counting symmetrically spaced pulses, in relation to the one asymmetrical pulse, and interpolating between counted pulses. The computed value is stored in random access memory as the variable ANG, which represents the rotational angle of the engine in its 720° cycle.

Based upon the POS input signal, the ECU 34 also derives a value for a SPEED variable, which is stored in random access memory. The SPEED variable represents the current rotational speed of the engine, and its value is normally computed by counting the number of symmetrical pulses in the POS input signal that occur during a fixed time interval, and multiplying that count by an appropriate constant to obtain the current rotational speed of the engine (in rpm).

A MAP (manifold absolute pressure) input signal is provided for the ECU 34 by a standard pressure sensor 44, which is positioned to measure the pressure in the air induction system 12 upstream of each check valve 32 and downstream from the throttle valve 30. In a standard fashion, the analog MAP signal is sampled by the analog-to-digital circuitry within ECU 34, and the corresponding sample values are then stored in random access memory, with the most recent Kth sample value being designated as MAP(K).

It is well known in the engine control art that the MAP signal can be used to derive an indication of the current load acting on the engine. Usually this is accomplished by low passing filtering the MAP(K) sample values using a conventional digital filter having a first order lag characteristic. The output samples generated from this filtering process will be designated as AVE-MAP(K), which approximate the average value of the MAP input signal. These AVEMAP(K) samples are also stored in memory and are substantially proportional to the current load acting on engine 10. It will also be recognized that other known techniques for obtaining engine load may also be used in the present invention, as for example, those based upon throttle valve position or engine mass air flow.

In most conventional computer engine control systems, it is also common practice to include a means for warning an operator when certain engine malfunctions are detected. For example, if a detected engine operating parameter is found to be outside an expected range of values, the ECU 34 will issue a WARN output signal to a warning indicator 46. This warning indicator 46 is typically a light bulb or light emitting diode (LED) that provides a visual warning, although a speaker and tone generator could be used to provide an audio alarm.

In this type of warning system, it is also common for the ECU 34 to store a predetermined binary WARNING CODE related to the WARN signal, for use in identifying the particular engine malfunction. The code can be read out, for example, by closing a switch 48, which is coupled to the ECU 34. After sensing the closure of switch 48, the ECU 48 outputs the value of each bit in the WARNING CODE by sequentially turning the warning indicator either on or off using the WARN output signal, depending on the particular value of each bit in the WARNING CODE. Alternatively, ECU 48 could be provided with a port for connecting to an auxiliary computer, which could then read the stored binary WARNING CODE for diagnostic purposes.

Many other sensors, actuators, ECU input signals, and ECU output signals are generally present in a conventional engine control system, however, these have not been specifically shown in FIG. 1, since they are not required in describing the present invention, and their inclusion would tend to make the present description overly complex.

As is generally known, the high speed performance of the four-stroke internal combustion engine 10 can be improved by advancing the opening and retarding the closing of each cylinder intake valve 24 during the engine operating cycle. Opening the intake valve 24 early, while exhaust valve 20 is still open (known as cross-over), facilitates the discharge of gaseous combustion products from cylinder 16 at high engine speeds, while delaying the closing of intake valve 24, until after the beginning of compression in cylinder 16, improves cylinder filling.

When these modifications to valve timing are implemented, low speed engine performance is improved by placing a check valve 32 in each intake passage 26 leading to an engine cylinder 16. Without such check valves, exhaust products flow back into the engine cylinders during the cross-over event under light engine loading, and portions of the cylinder air-fuel charges flow back into the air intake manifold 28, at low engine speeds.

In this type of engine, if a check valve 32 becomes damaged or malfunctions, the engine 10 will not perform properly at low speeds. The back flow of exhaust gas into the cylinder 16 can cause misfires and rough engine idling. The decreased volumetric efficiency of cylinder 16 reduces the engine output torque. In addition, cylinder 16 will receive less air, while the other engine cylinders receive excess air. This results in incorrect cylinder air-fuel mixtures, which in turn increases engine exhaust emissions.

Consequently, there exists a need for a system, which can diagnose and indicate faulty check valve operation in engines equipped with such valves, to ensure proper engine performance at low engine speeds.

Referring now to FIG. 2(A)–(C), there is shown graphical representations of the absolute pressure (in kPa) at locations in the air induction system 12 as a function of the rotational position of engine 10 (in degrees), during operation at idle speeds with light engine loading. At the angles of 0°, 720°, and 1440°, piston 14 is at top dead center after completion of the exhaust stroke in cylinder 16.

Graph (A) depicts the absolute pressure in the intake manifold 28, as measured by the pressure sensor 44, with each check valve functioning properly. Normally, the peak-to-peak variations in the intake manifold pressure are in the order of 3 to 5 kPa when the engine is operated at idle speeds with light engine loading.

Graph (B) depicts the absolute pressure in the air passage 26 between intake valve 24 and check valve 32. The large fluctuations in this pressure results during cross-over, when the intake valve 24 is opened with the exhaust valve 20 not yet fully closed. During this cross-over period, the pressure in cylinder 16 and air passage 26 becomes essential equal to the exhaust back pressure appearing at the open exhaust port 18, which is basically at atmospheric pressure (approximately 100 kPa).

Once the exhaust stroke is complete, piston 14 begins its intake stroke, drawing in air from the intake manifold 28 through the check valve 32. When this occurs, the pressure in the air intake passage 26 is quickly equalized to that in the intake manifold 28. Also, at high engine loads, the increased pressure of the air inducted into the air passage 26 substantially reduces the amplitude of the large pressure fluctuations occurring in the air passage 26. Consequently, the largest pressure differential appears across check valve 32 when the pressure in the intake manifold 28 is at its lowest value and the pressure in air passage 26 is at its highest value. This occurs when engine 10 is operated at idling speeds with light engine loading, where throttle valve 30 is essentially in its closed idle position.

Figure 2:
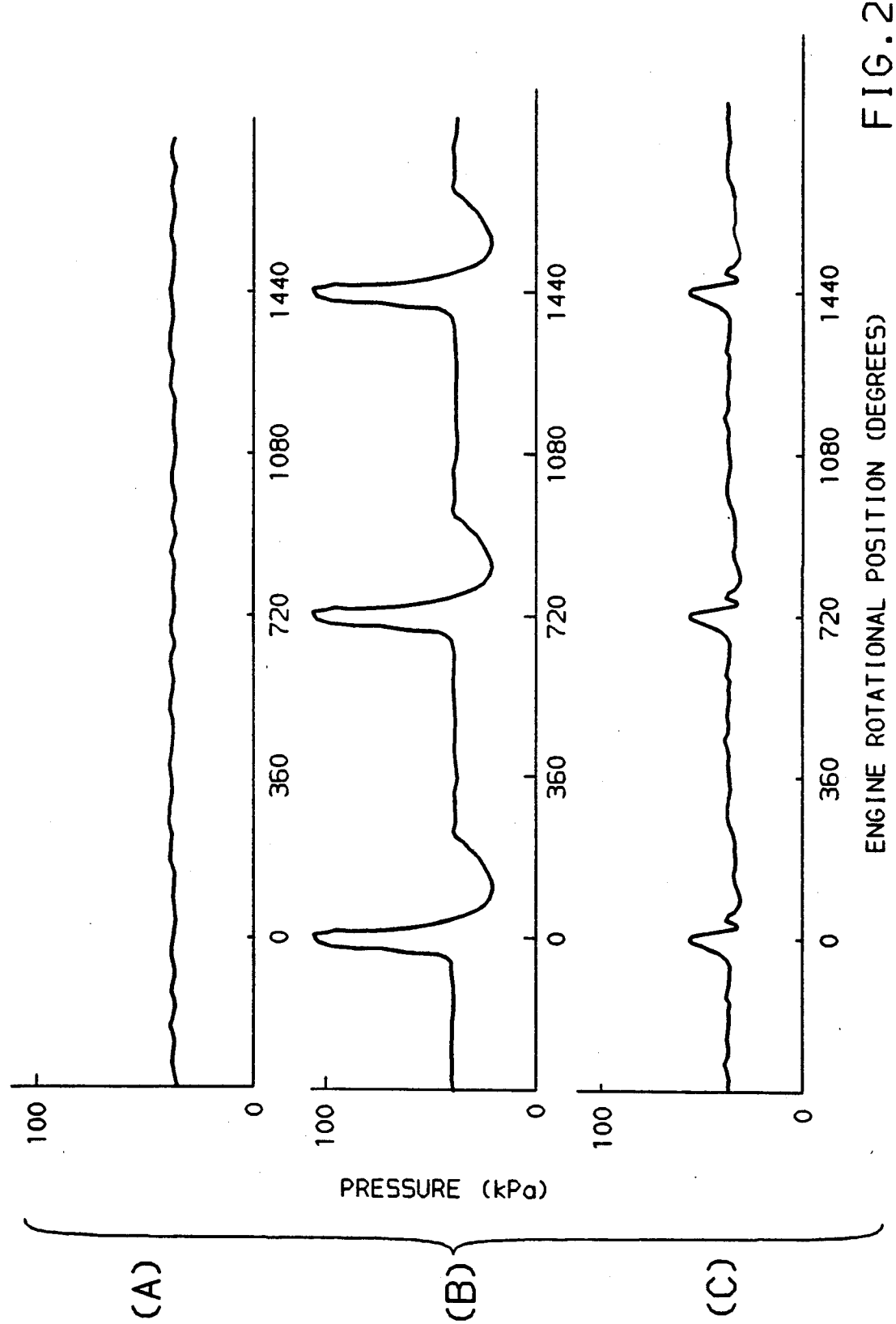
FIG. 2 provide graphical representations of the pressure at points in the engine air induction system as a function of engine rotational angle.

Graph (C) of FIG. 2 depicts the pressure measured in intake manifold 28 by pressure sensor 44, when check valve 32 is faulty and allows back flow from the air passage 26 into the intake manifold 28. As a result, an abnormal fluctuation in the intake manifold pressure occurs every engine cycle during the cross-over period, when the pressure in the intake passage 26 would normally be at its maximum value. Measurements indicate that the peak value of the intake manifold pressure fluctuation is in the order of 50 kPa and the peak-to-peak variation is in the order of 18 kPa, when check valve 32 completely malfunctions.

The present invention is directed toward utilizing the abnormal fluctuations in the intake manifold pressure, as depicted in graph (C), to provide a system for diagnosing faulty check valve operation. The system measures the pressure of air in the induction system 12, upstream of each check valve 32 and downstream from the induction system throttle valve 30. An indication of faulty check valve operation is then produced, if an abnormal fluctuation is detected in the measured pressure. Since typical engine computer control systems generally include a manifold absolute pressure sensor 44 for measuring the pressure in the intake manifold 28 and a warning indicator 46 to alert an operator to engine malfunctions, the present invention can be easily implemented in such control systems by simply making computer software changes, without requiring any additional hardware.

Preferably the system performs the diagnostic function when the engine is operating in a defined mode, at engine idle speeds with light loading. As discussed previously, the pressure differential appearing across each check valve is essentially maximized when the engine operates in this mode. Consequently, the largest fluctuation in the measure manifold pressure also occurs when the engine is operating in this mode, making it easier to detect such abnormal fluctuations.

Figure 3A:
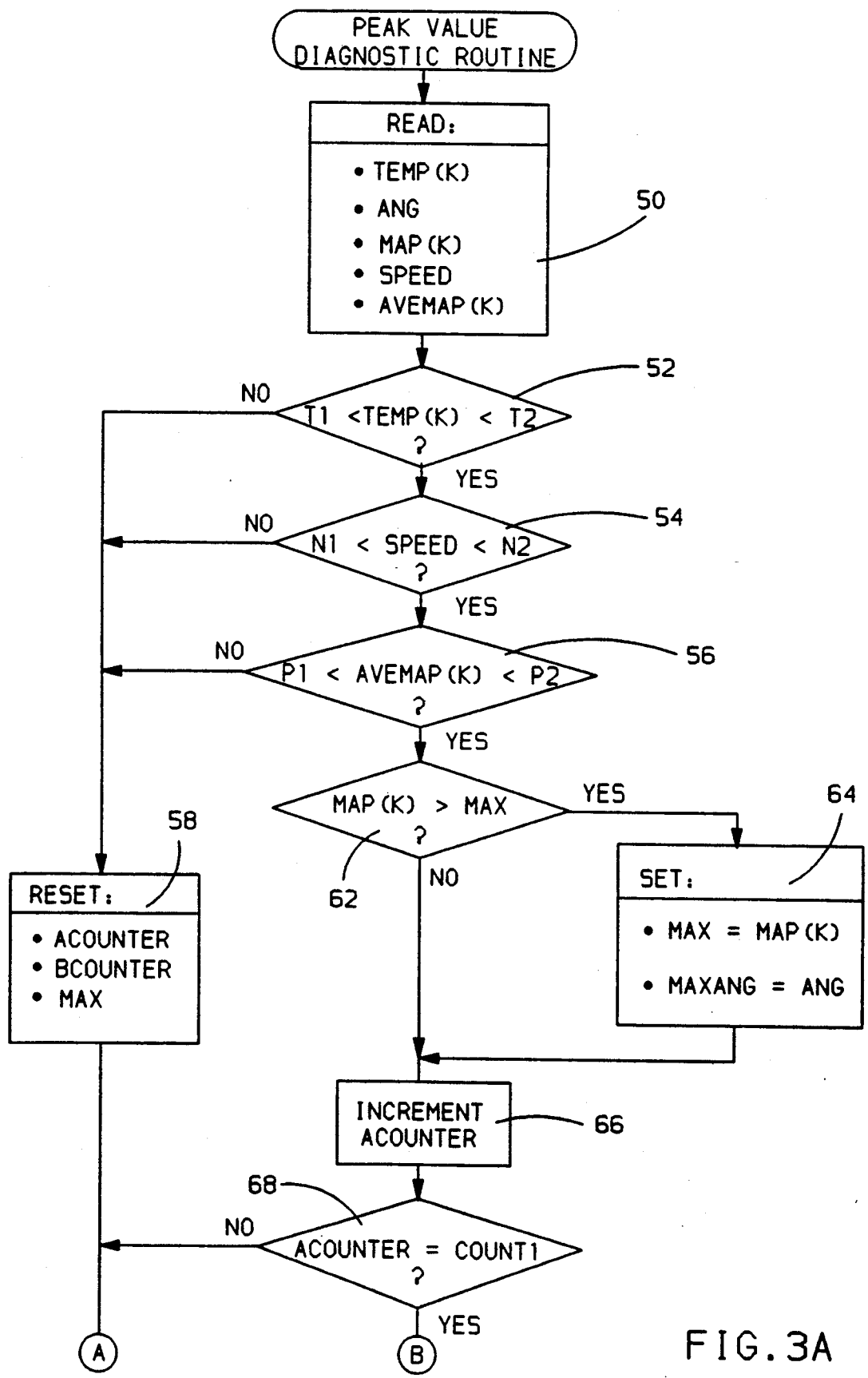
FIGS. 3A-3B provide a flow diagram representative of the steps executed by the electronic control unit of FIG. 1, when diagnosing faulty check valve operation based upon the peak value of an abnormal pressure fluctuation in the air induction system.
Figure 3B:
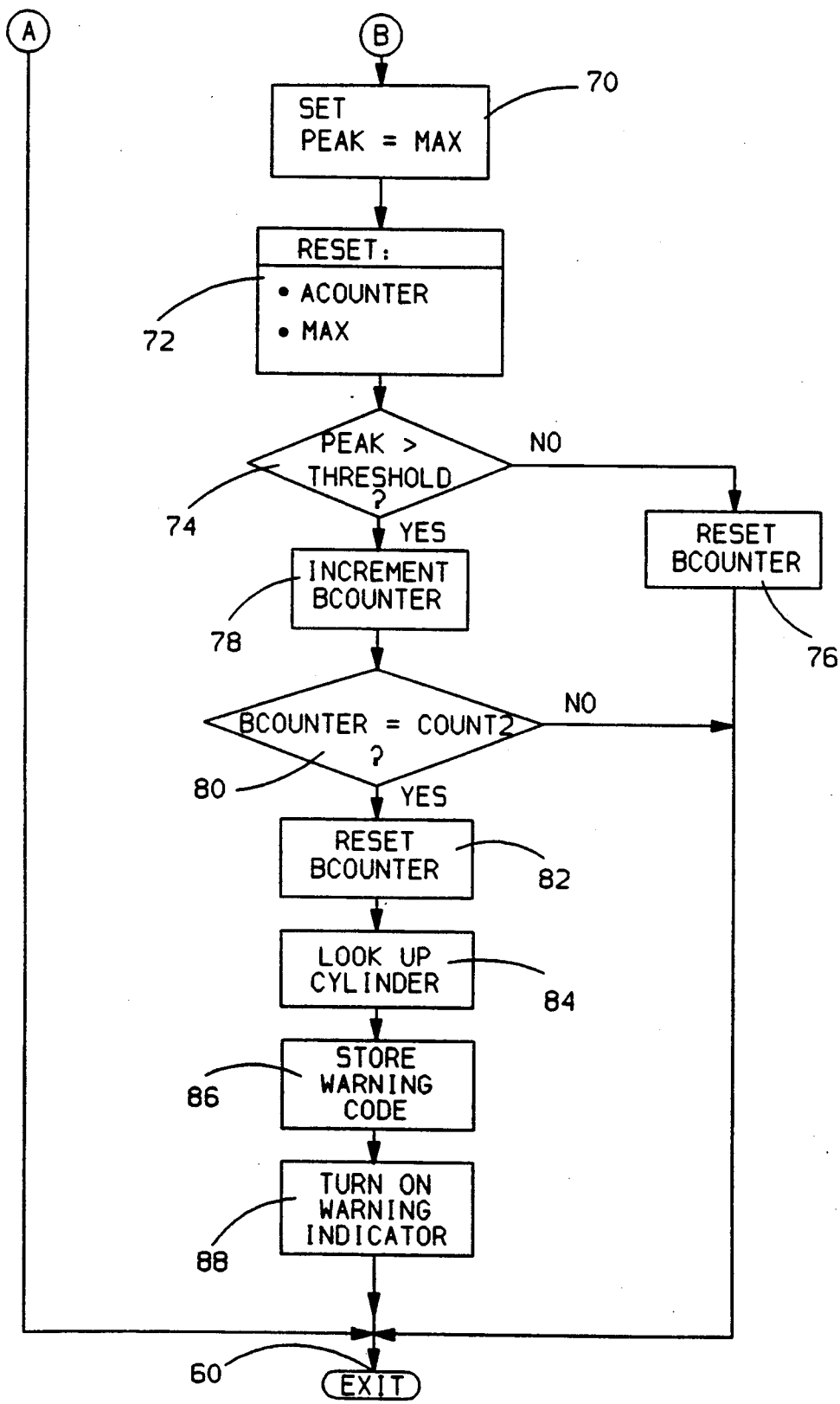

Referring now to FIGS. 3A-B, there is shown a flow diagram representative of the steps executed by ECU 34 in diagnosing faulty check valve operation based upon a peak value associated with abnormal pressure fluctuations in the engine air induction system. This Peak Value Diagnostic Routine forms a portion of the main looped control program, which is continuously executed by ECU 34 in controlling the operation of engine 10. After engine start up, all counters, registers, and timers within the ECU are properly initialized before entering the main control program.

Each time the looped main control program is executed, the Peak Value Diagnostic Routine is called at the appropriate location in the main control program.

Execution of the Peak Value Diagnostic Routine begins at step 50, where the current values for the TEMP(K), ANG, MAP(K), SPEED, and AVEMAP(K) variables are obtained from locations in the random access memory of ECU 34. As discussed previously, TEMP(K) indicates the temperature of the engine coolant; ANG represents the angular position of the engine in its operating cycle (from top dead center in the exhaust stroke); MAP(K) indicates the pressure in the intake manifold upstream of each engine check valve 32 and downstream form the air throttle valve 30; SPEED represents the rotational speed of the engine; and AVEMAP(K) indicates the average value of the pressure in the intake manifold. After obtaining the currently stored values for these variables, the routine proceeds to step 52.

At step 52, the routine determines whether the temperature of the engine coolant is greater than a first defined temperature T1 and less than a second defined temperature T2 (for example, 70° C. and 105° C., respectively). If the temperature TEMP(K) is within the defined range, the engine is considered to be operating in a normal warmed up mode, and the routine proceeds to step 54, otherwise the routine passes to step 58.

When the engine is properly warmed up, the routine next proceeds to step 54 to determines whether the engine is operating at a rotational speed between a first defined speed N1 and a second defined speed N2 (for example, 475 rpm and 525 rpm, respectively). If the engine speed is within the range extending from N1 to N2, the engine is considered to be operating at idle speeds, and the program proceeds to step 56, otherwise it passes to step 58.

At step 56, the program determines whether the average manifold pressure indicated by AVEMAP(K) is between a first defined pressure P1 and a second defined pressure P2 (for example, 30 kPa and 35 kPa, respectively). If the average manifold pressure is within the range extending from P1 to P2, the engine is considered to be operating with light engine loading, and the routine proceeds to step 62, otherwise the routine passes to step 58.

The sequence of decisions in steps 52, 54, and 56 basically determines whether the engine is operating in a defined mode at idle speeds with light engine loading with the engine operating in a warmed up condition. As discussed previously, it is preferable that the engine be operating in this defined mode, when diagnosing check valve operation, since abnormal fluctuations in manifold pressure due to faulty check valves are the largest and easiest to detect when the engine operates at idle speeds with light loading. Requiring that the engine operate in the warmed up condition assures that range defining idle speeds (between speed N1 and speed N2 at step 54) will remain constant. Normally, the engine control system sets the idle speed range high for a cold engine, and then decreases the idle speed range as a function of coolant temperature, until the engine is considered to be warmed up. Also, frictional engine loading is reduced when the engine warms up due to the decreased viscosity of the engine lubricating oil.

When engine is found not to be operating in the defined mode, the routine proceeds to step 58, where two counters, ACOUNTER and BCOUNTER, along with a variable MAX are all reset to their initialized values, i.e. the values set prior to entering the routine for the first time (normally zero). From step 58, the routine is exited at point 60.

When the engine is found to be operating in the defined mode, the routine proceeds from step 56 to step 62, where a decision is required as to whether the current value for the manifold pressure MAP(K) is greater than a defined value MAX. If MAP(K) is not greater than MAX the routine proceeds to step 66. However, if MAP(K) is greater than MAX, the routine first passes to step 64, before proceeding to step 66.

At step 64, the variable MAX is set equal to MAP(K) and a variable MAXANG is set equal to the current rotational angle of the engine ANG. In this fashion, the maximum value for the manifold pressure is stored as the variable MAX, and the angle of rotation corresponding to this maximum pressure is stored as the variable MAXANG.

At step 66, the current count of counter ACOUNTER is incremented by one. Next at step 68, the count of ACOUNTER is examined to determine whether it is equal to a predetermined count designated at COUNT1. If ACOUNTER has reached the predetermined COUNT1, the routine passes to step 70, otherwise it proceeds to exit the routine at point 60.

When the counter ACOUNTER equals COUNT1, the routine passes to step 70, where a value PEAK is set equal to the current value of MAX determined at step 104. This PEAK value represents the maximum peak value of any fluctuation occurring in the measured manifold pressure as the ACOUNTER is incremented from its initial count (normally zero) to COUNT1.

It will be recognized that the value of COUNT1 defines the number of values of manifold pressure MAP(K) in a set that are examined (at step 62), before determining the PEAK value associated with the measured manifold pressure (at step 70). It is preferable that the value of COUNT1 be chosen such that the MAP input signal is sampled over more than one engine operating cycle when obtaining the predetermined number of sample manifold pressure values in the set. Since any abnormal fluctuation caused by a faulty check valve repeats each engine cycle, if sampling is extended over more than one operating cycle, an excessive sampling rate is not required to obtain an accurate PEAK value representing the measured manifold pressure. In addition, the sampling will not have to be synchronized with the rotation of the engine (assuming that the sampling frequency is not an exact multiple of the engine firing frequency). The same also applies where a peak-to-peak value is obtained to represent fluctuations in measured manifold pressure (as will be described subsequently in discussing the embodiment related to FIGS. 4A-B).

From step 70, the routine proceeds to step 72 where the ACOUNTER and the variable MAX are reset to their initialized values.

Next at step 74, the value of PEAK is compared with a predetermined THRESHOLD value. If PEAK is not greater than THRESHOLD, then an abnormal fluctuation in the measured manifold pressure is considered not to have occurred, and the routine will proceed to step 76 to reset a counter designated as BCOUNTER to its initialized value (normally to zero) prior to exiting the routine at step 60. However, if PEAK exceeds the THRESHOLD value, this indicates that an abnormal fluctuation in the measured manifold pressure is considered to have occurred, and the routine proceeds to step 78. The value selected for THRESHOLD will vary from application to application, but it should be greater than the maximum expected variation in the manifold pressure (for example, 35 kPa) and less than the largest expected variation in manifold pressure caused by the complete failure of a check valve, which is approximately 50 kPa for the application illustrated in FIG. 2(C)). Thus, for this application, THRESHOLD can be set at 42 to 44 kPa to detect the abnormal pressure fluctuations depicted in FIG. 2(C).

When an abnormal fluctuation is detected at step 74, the routine proceeds to step 78, where the count of BCOUNTER is incremented by one.

Next at step 80, a decision is required as to whether the BCOUNTER has a count equal to the value COUNT2. If the count of BCOUNTER does not equal COUNT2, the routine exits at point 60. However, if the count of BCOUNTER equals COUNT2, this indicates that a predetermined number of sequential abnormal fluctuations (as determined by the value of COUNT2) in the measured manifold pressure have been detected. When this occurs, the routine passes to step 82, which indicates that the diagnostic system definitely considers a check valve to be faulty. By requiring the detection of more than one abnormal pressure fluctuation in sequence, before indicating the presence of a faulty check valve, the chance of an incorrect diagnosis caused by the occurrence of measurement noise or pressure transients is reduced.

When a faulty check valve is diagnosed the routine passes to step 82. There the count of the BCOUNTER is reset to its initialized value (normally zero), before proceeding to step 84.

At step 84, a CYLINDER number for the cylinder associated with the faulty check valve is identified by looking up the value of CYLINDER in a table as a function of the value of the variable MAXANG found at step 64. As described previously, the value of MAXANG represents the engine rotational angle corresponding to the most recently detected abnormal fluctuation in measured manifold pressure. As such, MAXANG can be used to identify the particular cylinder associated with the indicated faulty check valve. The look up table is established to provide a cylinder number based upon the value of the rotational angle MAXANG. For example, consider an engine having four cylinders with the firing order 1-2-3-4, with the rotational angle of 0° corresponding to top dead center in the exhaust stroke for cylinder number 1. The look up table would then be configured to provide the CYLINDER number 1, 2, 3, or 4, whenever the value of MAXANG is within the respective range of rotational angles defined by $-90° \leq MAXANG < 90°$, $90° \leq MAXANG < 270°$, $270° \leq MAXANG < 450°$, or $450° \leq MAXANG < 630°$. Of course, engines having different numbers of cylinders or different firing orders will have different CYLINDER numbers associated with different ranges of rotational angles in the look up table. After looking up the CYLINDER number based upon the value of MAXANG, the routine then proceeds to step 86.

At step 86, the ECU 34 stores a WARNING CODE associated with the detection of a faulty check valve. The WARNING CODE includes a defined first portion indicating that a check valve is faulty, to distinguish it from other codes used to indicate other types of engine malfunctions. The CYLINDER number found at step 84 forms the second portion of the WARNING CODE, which identifies the particular cylinder having the faulty check valve.

Next, at step 88, the ECU 34 issues a WARN output signal to activate the warning indicator 46. As discussed previously, the stored WARNING CODE may be read out by closing switch 48, to determine that a check valve has malfunctioned and identify the cylinder associated with the faulty check valve. As a consequence, a substantial reduction in the time required to identify and repair a faulty check valve can be realized with the use of the present invention.

Figure 4A:
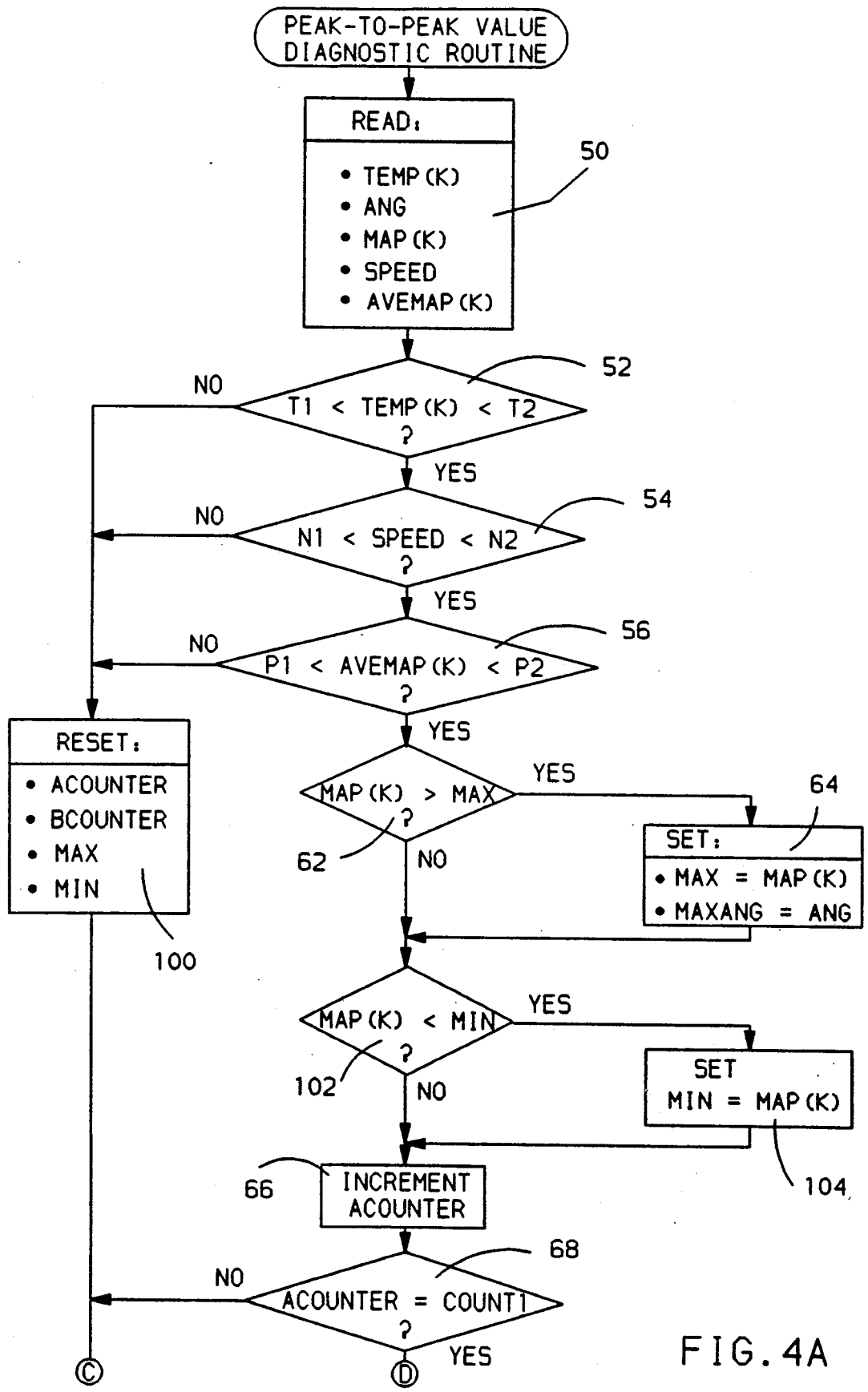
FIGS. 4A-4B provide a flow diagram representative of the steps executed by the electronic control unit of FIG. 1, when diagnosing faulty check valve operation based upon the peak-to-peak value of an abnormal pressure fluctuation in the air induction system.
Figure 4B:
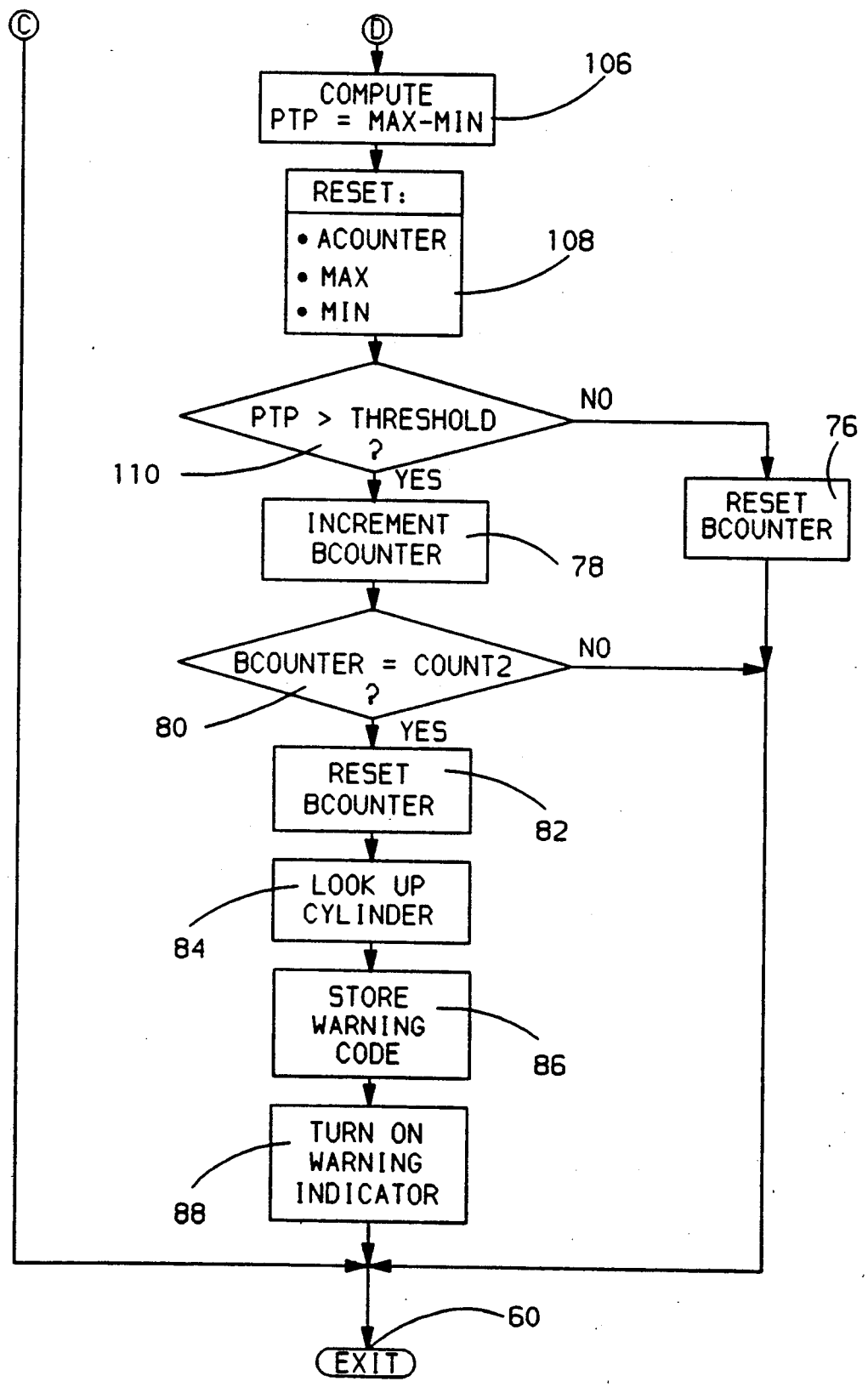

Referring now to FIGS. 4A-B, there is shown a flow diagram representative of the steps executed by ECU 34 in a second embodiment of the present invention. In this embodiment, the detection of faulty check valve operation is based upon a peak-to-peak value associated with abnormal pressure fluctuations in the engine air induction system, rather than the peak value used in the flow diagram presented in FIGS. 3A-B.

The Peak-To-Peak Value Diagnostic Routine of FIGS. 4A-B forms a portion of the main looped control program that is continuously executed by ECU 34 in controlling the operation of engine 10. This routine contains many identically numbered steps that were previously discussed in describing the flow diagram for the Peak Value Routine of FIGS. 3A-B. Consequently, the present discussion will be limited to the difference between the steps of the two routines.

After entering the Peak-To-Peak Value Routine, the same steps described in the previous routine are executed, until the new steps 102 and 104 are encountered. These new steps have been included in the present routine to detect a minimum value MIN associated with fluctuations in the measured manifold pressure.

At step 102, a decision is required as to whether the current value of the sampled manifold pressure MAP(K) is less than a variable MIN, which would normally be initialized to have a value greater than the largest expected manifold pressure (for example, 120 kPa). If MAP(K) is not less than MIN, the routine passes to step 66. However, when MAP(K) is less than MIN, the routine passes to step 104, where the variable MIN is then set equal to the value of MAP(K). The routine then passes to step 66.

Note also, that step 58 of the previous routine (FIGS. 3A-B) has been replaced with step 100 in the present routine. In addition to resetting the ACOUNTER, BCOUNTER, and variable MAX, as was done in step 58, the new step 100 includes the resetting of the MIN variable added by step 104 in the present routine.

In addition, steps 70 to 74 in the previous routine (FIGS. 3A-B) have been replaced by new steps 106 to 110 in the present routine. At step 106, a peak-to-peak value PTP is computed by subtracting the value of MIN, found at step 104, from the value of MAX, found at step 64. This PTP value represents the largest peak-to-peak fluctuation obtained from the set of measured manifold pressure samples MAP(K) as the ACOUNTER is incremented from its initial count to COUNT1.

From step 106, the routine proceeds to new step 108, where the ACOUNTER, the variable MAX, and the variable MIN are all reset to their initialized values. Note that new step 106 differs from step 72 of the previous routine, only by including MIN in the list of variable to be reset.

From step 108, the present routine proceeds to new step 110, where the value of PTP is compared with a predetermined THRESHOLD value. If the PTP value is not greater than THRESHOLD, then an abnormal fluctuation in the measured manifold pressure is considered not to have occurred. In this case the routine proceeds to step 76. However, if PTP exceeds the THRESHOLD value, this indicates that an abnormal fluctuation in the measured pressure is considered to have occurred and the routine then passes to step 78. From either step 76 or 78, the remainder of the present routine is identical with that described earlier for the routine in FIGS. 3A-B.

The Peak Value Diagnostic Routine depicted in FIGS. 3A-B provides for the detection of faulty check valve based upon the peak or maximum value of the intake manifold pressure, and consequently requires fewer computational steps than the Peak-To-Peak Diagnostic Routine shown in FIGS. 4A-B. This reduces the execution time of the routine, which can be significant in engine control applications. On the other hand, when execution time is not an important factor, the PEAK-TO-PEAK Diagnostic Routine improves the capability of detecting faulty check valve operation since the peak-to-peak value of an abnormal pressure fluctuation is relatively larger than the peak value.

In the above described embodiments of the present invention, the check valve diagnostic system was applied to a four-stroke engine. It will be recognized by those skilled in the art that the invention is equally applicable to two-stroke engines employing check valves in their air induction systems. For two-stroke engine applications, abnormal fluctuations in induction system pressure due to a faulty check valve would repeat with every rotation of the engine crankshaft, and would occur at defined times dependent upon the locations of the intake and exhaust ports on the cylinder walls. Thus, the CYLINDER look up table would need to be modified accordingly to provide the proper cylinder identification in two-stroke engines.

It will also be recognized that in the two-stroke application, the engine rotational sensor can be rotated by the engine crankshaft, which rotates only once during the complete two-stroke engine cycle. Such a crankshaft rotational sensor could also be used in the four-stroke engine application, however, it would then only be possible to associate pairs of engine cylinders with a faulty check valve, since the precise rotational position in the engine cycle would not be available.

Thus, the aforementioned description of the preferred embodiments of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. For an internal combustion engine having an air induction system including a throttle valve for regulating air flow into the engine and an air passage leading to each engine cylinder downstream from the throttle valve, each air passage having a check valve disposed therein for allowing air flow in a direction toward the associated cylinder and for preventing back flow in the opposite direction, a system for diagnosing faulty check valve operation comprising:
   means for measuring the pressure in the air induction system upstream of each check valve and downstream from the throttle valve;
   means for detecting an abnormal fluctuation in the measured pressure in the air induction system; and
   means for producing an indication of faulty check valve operation in response to the detected abnormal fluctuation in the measured pressure in the air induction system.

2. The system as set forth in claim 1, further including means for determining when the engine is operating in a defined mode at engine idle speeds with light engine loading, and wherein the detection of the abnormal fluctuation occurs only when the engine is operating in the defined mode.

3. The system as set forth in claim 1, wherein the means for detecting the abnormal fluctuation in the measured pressure in the air induction system further includes:
   means for obtaining a peak value associated with the the measured pressure in the induction system;
   means for comparing the peak value with a predetermined threshold value and for indicating the occurrence of the abnormal fluctuation when the peak value exceeds the threshold value.

4. The system as set forth in claim 3, wherein the means for obtaining the peak value further includes:
   means for sampling the measured pressure to obtain a set of sampled pressure values; and
   means for selecting a largest value from among the set of sampled pressure values, thereby obtaining the peak value.

5. The system as set forth in claim 4, wherein the measured pressure is sampled over more than one complete engine cycle to obtain a predetermined number of sampled pressure values for the set.

6. The system as set forth in claim 1, wherein the means for detecting the abnormal fluctuation in the measured pressure further includes:
   means for obtaining a peak-to-peak value associated with the magnitude of the measured pressure in the air induction system; and
   means for comparing the peak-to-peak value with a predetermined threshold value and for indicating the occurrence of the abnormal fluctuation when the peak-to-peak value exceeds the threshold value.

7. The system as set forth in claim 6, wherein the means for obtaining the peak-to-peak value further includes:

means for sampling the measured pressure to obtain a set of sampled pressure values;

means for selecting a largest value and a smallest value from among the set of sampled pressure values; and means for subtracting the largest value and the smallest value, thereby obtaining the peak-to-peak value.

8. The system as set forth in claim 7, wherein the measured pressure is sampled over more than one complete engine cycle to obtain a predetermined number of sampled pressure values for the set.

9. For an internal combustion engine having an air induction system including a throttle valve for regulating air flow into the engine and an air passage leading to each engine cylinder downstream from the throttle valve, each air passage having a check valve disposed therein for allowing air flow in a direction toward the associated cylinder and preventing flow in the opposite direction, a system for diagnosing faulty check valve operation comprising:

means for measuring the pressure in the air induction system upstream of each check valve and downstream from the throttle valve;

means for detecting an abnormal fluctuation in the measured pressure in the air induction system;

means for deriving an engine rotational position corresponding to the occurrence of the abnormal fluctuation in the measured pressure in the air induction system;

means for producing an indication of faulty check valve operation in response to the detected abnormal fluctuation in the measured pressure in the air induction system; and means for identifying the cylinder associated with the indication of faulty check valve operation, based upon the engine rotational position corresponding to the occurrence of the abnormal fluctuation.

10. For an internal combustion engine having an air induction system including a throttle valve for regulating air flow into the engine and an air passage leading to each engine cylinder downstream from the throttle valve, each air passage having a check valve disposed therein for allowing air flow in a direction toward the associated cylinder and preventing flow in the opposite direction, a system for diagnosing faulty check valve operation comprising:

means for measuring the pressure in the air induction system upstream of each check valve and downstream from the throttle valve;

means for detecting when the engine is operating in a defined mode at engine idle speeds with light engine loading;

means for detecting abnormal fluctuations in the measured pressure in the air induction system when the engine is operating in the defined mode; and means for producing an indication of faulty check valve operation after the detection of a predetermined number of the abnormal fluctuations, when the engine continuously operates in the defined mode.

* * * * *